(12) United States Patent
Kim et al.

(10) Patent No.: US 9,860,043 B2
(45) Date of Patent: *Jan. 2, 2018

(54) METHOD AND APPARATUS FOR TRANSMITTING/RECEIVING CHANNEL QUALITY INFORMATION IN A COMMUNICATION SYSTEM USING AN ORTHOGONAL FREQUENCY DIVISION MULTIPLEXING SCHEME

(71) Applicant: Samsung Electronics Co., Ltd., Gyeonggi-do (KR)

(72) Inventors: Jee-Hyun Kim, Gyeonggi-do (KR); Jeong-Tae Oh, Gyeonggi-do (KR); Hoon Huh, Gyeonggi-do (KR); Jae-Ho Jeon, Gyeonggi-do (KR); Soon-Young Yoon, Seoul (KR); Seung-Joo Maeng, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 0 days.

This patent is subject to a terminal disclaimer.

(21) Appl. No.: 14/507,375

(22) Filed: Oct. 6, 2014

(65) Prior Publication Data
US 2015/0023301 A1    Jan. 22, 2015

Related U.S. Application Data

(63) Continuation of application No. 13/043,073, filed on Mar. 8, 2011, now Pat. No. 8,854,995, which is a (Continued)

(30) Foreign Application Priority Data

Mar. 12, 2004    (KR) .................. 10-2004-0017061

(51) Int. Cl.
*H04L 5/00* (2006.01)
*H04L 1/00* (2006.01)

(52) U.S. Cl.
CPC .......... *H04L 5/0053* (2013.01); *H04L 1/0026* (2013.01); *H04L 5/006* (2013.01);
(Continued)

(58) Field of Classification Search
CPC ........ H04W 24/00; H04L 43/50; H04L 43/08; H04B 17/003
See application file for complete search history.

(56) References Cited

U.S. PATENT DOCUMENTS 5,168,275 A * 12/1992 Harrison ............ G11B 20/1419
                                                235/449
6,175,734 B1    1/2001  Desgagne et al.
(Continued)

FOREIGN PATENT DOCUMENTS

CN          1463099          12/2003
JP         2002-185996        6/2002
(Continued)

OTHER PUBLICATIONS

Choi Ho Kyu, IMT-2000 High Packet Data Transmission System (1xEV-DV, HSDPA), Jul. 1, 2002.
(Continued)

*Primary Examiner* — Zhiren Qin
(74) *Attorney, Agent, or Firm* — The Farrell Law Firm, P.C.

(57) ABSTRACT

A method and Mobile Subscriber Station (MSS) are provided for transmitting Channel Quality Information (CQI) in a wireless communication system. The method includes transmitting first information including a value related to CQI for at least one of bands; and transmitting second information including a differential CQI for the at least one of the bands, wherein each band comprises a plurality of adjacent subcarriers.

28 Claims, 7 Drawing Sheets

Related U.S. Application Data continuation of application No. 11/077,857, filed on Mar. 11, 2005, now Pat. No. 7,933,195.

(52) U.S. Cl.
CPC .......... *H04L 5/0039* (2013.01); *H04L 5/0041* (2013.01); *H04L 5/0082* (2013.01); *H04L 5/0096* (2013.01); *H04L 5/0007* (2013.01); *H04L 5/0044* (2013.01)

(56) References Cited

U.S. PATENT DOCUMENTS

| | | | |
|---|---|---|---|
| 6,904,283 B2 | 6/2005 | Li et al. | |
| 7,573,900 B2 | 8/2009 | Kim et al. | |
| 2001/0040880 A1 | 11/2001 | Chen et al. | |
| 2001/0042235 A1 | 11/2001 | Djokovic et al. | |
| 2002/0030587 A1* | 3/2002 | Jackson | G01S 13/753 340/10.1 |
| 2002/0056066 A1 | 5/2002 | Gesbert et al. | |
| 2002/0110088 A1 | 8/2002 | Lundby et al. | |
| 2002/0119781 A1 | 8/2002 | Li et al. | |
| 2002/0177447 A1* | 11/2002 | Walton | H04W 52/0261 455/450 |
| 2002/0183010 A1 | 12/2002 | Catreux et al. | |
| 2002/0188798 A1* | 12/2002 | Kumaki | G06F 12/0893 711/104 |
| 2002/0193668 A1* | 12/2002 | Munneke | G06F 19/3431 600/300 |
| 2003/0002471 A1 | 1/2003 | Crawford et al. | |
| 2003/0112744 A1 | 6/2003 | Baum et al. | |
| 2003/0123396 A1* | 7/2003 | Seo | H04B 1/707 370/252 |
| 2003/0137955 A1 | 7/2003 | Kim et al. | |
| 2003/0161285 A1* | 8/2003 | Tiedemann, Jr. | H04B 17/24 370/332 |
| 2003/0162511 A1* | 8/2003 | Kim | H04B 7/061 455/101 |
| 2003/0204513 A1* | 10/2003 | Bumbulis | G06F 17/30327 |
| 2003/0228850 A1 | 12/2003 | Hwang | |
| 2004/0047296 A1* | 3/2004 | Tzannes | H04L 1/0028 370/252 |
| 2004/0062193 A1* | 4/2004 | Ma | H04L 1/0618 370/208 |
| 2005/0041622 A1* | 2/2005 | Dubuc | H04L 1/0026 370/332 |
| 2005/0143084 A1* | 6/2005 | Cheng | H04W 8/24 455/452.2 |
| 2005/0180374 A1 | 8/2005 | Balachandran et al. | |
| 2005/0272433 A1 | 12/2005 | Won et al. | |
| 2005/0289256 A1 | 12/2005 | Cudak et al. | |
| 2007/0263735 A1* | 11/2007 | Tong et al. | 375/260 |
| 2011/0299417 A1 | 12/2011 | Nanda et al. | |

FOREIGN PATENT DOCUMENTS

| | | |
|---|---|---|
| KR | 1020030062135 | 7/2003 |
| KR | 1020030094786 | 12/2003 |
| KR | 1020040002249 | 1/2004 |
| RU | 2 127 948 | 3/1999 |
| RU | 2 212 119 | 9/2003 |
| WO | WO 99/13675 | 3/1999 |
| WO | WO 03/071721 | 8/2003 |
| WO | WO 03/096598 | 11/2003 |

OTHER PUBLICATIONS

Jeon Tae Oh et al., "Uplink Control Channels", IEEE 802.16 Broadband Wireless Access Working Group, Mar. 11, 2004.

\* cited by examiner

METHOD AND APPARATUS FOR TRANSMITTING/RECEIVING CHANNEL QUALITY INFORMATION IN A COMMUNICATION SYSTEM USING AN ORTHOGONAL FREQUENCY DIVISION MULTIPLEXING SCHEME

PRIORITY

This application is a Continuation Application of U.S. patent application Ser. No. 13/043,073, filed in the U.S. Patent and Trademark Office on Mar. 8, 2011, which is a Continuation Application of U.S. patent application Ser. No. 11/077,857, filed in the U.S. Patent and Trademark Office on Mar. 11, 2005, and issued as U.S. Pat. No. 7,933,195, on Apr. 26, 2011 and claims priority under 35 U.S.C. §119 to an application filed in the Korean Intellectual Property Office on Mar. 12, 2004 and assigned Serial No. 10-2004-0017061, the content of each of which is incorporated herein by reference.

BACKGROUND OF THE INVENTION

1. Field of the Invention

The present invention relates generally to a communication system using an Orthogonal Frequency Division Multiplexing (OFDM) scheme, and in particular, to an apparatus and method for transmitting/receiving channel quality information (CQI) for subcarriers between a mobile subscriber station (MSS) and a base station (BS).

2. Description of the Related Art

With the rapid progress of mobile communication systems, the required amount of data and its processing speed are increasing rapidly. Generally, when data is transmitted over a wireless channel at a high speed, the data experiences a high bit error rate (BER) due to multipath fading and Doppler spread. A wireless access scheme appropriate for the wireless channel is required to compensate for the high BER, so a Spread Spectrum (SS) scheme having advantages of lower transmission power and lower detection probability is becoming popular.

The SS scheme is roughly classified into a Direct Sequence Spread Spectrum (DSSS) scheme and a Frequency Hopping Spread Spectrum (FHSS) scheme.

The DSSS scheme can actively adjust to a multipath phenomenon occurring in a wireless channel using a rake receiver that uses path diversity of the wireless channel. The DSSS scheme can be efficiently used at a transfer rate of 10 Mbps or less. However, when transmitting data at a rate of 10 Mbps or higher, the DSSS scheme increases in inter-chip interference, causing an abrupt increase in hardware complexity. Also, it is known that the DSSS scheme has a limitation in user capacity due to multiuser interference.

The FHSS scheme can reduce multichannel interference and narrowband impulse noise because it transmits data, hopping between frequencies with random sequences. In the FHSS scheme, correct coherence between a transmitter and a receiver is very important, but it is difficult to achieve coherent detection during high-speed data transmission.

An Orthogonal Frequency Division Multiplexing (OFDM) scheme is a scheme appropriate for high-speed data transmission in a wire/wireless channel, and on which extensive research is being conducted. The OFDM scheme transmits data using multiple carriers, and is a type of a Multi-Carrier Modulation (MCM) scheme that parallel-converts a serial input symbol stream into parallel symbols and modulates the parallel symbols with a plurality of narrower-band subcarriers having mutual orthogonality before transmission. A subcarrier in a specific time interval is referred to as a "tone."

The OFDM scheme has high frequency efficiency because it uses a plurality of subcarriers having mutual orthogonality as described above. Because a process of modulating/demodulating the plurality of subcarrier signals is equivalent to a process of performing an Inverse Discrete Fourier Transform (IDFT) and a Discrete Fourier Transform (DFT), a transmitter and a receiver can modulate and demodulate the subcarrier signals at a high speed using the Inverse Fast Fourier Transform (IFFT) and the Fast Fourier Transform (FFT), respectively.

Because the OFDM scheme is appropriate for high-speed data transmission, it has been adopted as a standard scheme under the Institute of Electrical and Electronics Engineers (IEEE) 802.11a standard, the HIPELAN/2 High-Speed Wireless Local Area Network (LAN) standard, the IEEE 802.16 standard, the Digital Audio Broadcasting (DAB) standard, the Digital Terrestrial Television Broadcasting (DTTB) standard, the Asymmetric Digital Subscriber Line (ADSL) standard, and the Very-high data rate Digital Subscriber Line (VDSL) standard.

In a communication system using the OFDM scheme (hereinafter referred to as an "OFDM communication system"), a structure of a frequency domain of an OFDM symbol utilizes subcarriers. The subcarriers are divided into data subcarriers used for data transmission, pilot subcarriers used for transmitting symbols in a predefined pattern for various estimation purposes, and null subcarriers for a guard interval and a static component. All of the subcarriers except for the null subcarriers, i.e., the data subcarriers and the pilot subcarriers, are effective subcarriers.

An Orthogonal Frequency Division Multiple Access (OFDMA) scheme, which is a multiple access scheme based on the OFDM scheme, divides the effective subcarriers into a plurality of subcarrier sets, i.e., subchannels. The "subchannel" refers to a channel comprised of at least one subcarrier, and the subcarriers constituting the subchannel may be either adjacent to each other, or not adjacent to each other. A communication system using the OFDMA scheme (hereinafter, referred to as an "OFDMA communication system") can simultaneously provide services to a plurality of users.

A general subchannel allocation structure in the OFDMA communication system will now be described with reference to FIG. 1.

Referring to FIG. 1, the subcarriers used in the OFDMA communication system include a DC subcarrier representing a static component in a time domain, the subcarriers representing a high-frequency band of a frequency domain, i.e., a guard interval in the time domain, and the effective subcarriers. The effective subcarriers constitute a plurality of subchannels, and in FIG. 1, the effective subcarriers constitute three subchannels, i.e., a subchannel #1 to a subchannel #3.

The OFDMA communication system uses an Adaptive Modulation and Coding (AMC) scheme in order to support high-speed data transmission through a wireless channel. The AMC scheme refers to a data transmission scheme for adaptively selecting a modulation scheme and a coding scheme according to a channel state between a cell, i.e., a base station (BS), and a mobile subscriber station (MSS), thereby increasing the entire cell efficiency.

The AMC scheme has a plurality of modulation schemes and a plurality of coding schemes, and modulates and codes channel signals with an appropriate combination of the modulation schemes and the coding schemes. Commonly, each combination of the modulation schemes and the coding schemes is referred to as a Modulation and Coding Scheme (MCS), and a plurality of MCSs with a level 1 to a level N are defined by the number of the MCSs. One of the MCS levels is adaptively selected according to a channel state between a BS and an MSS wirelessly connected to the BS.

In order to use the AMC scheme, an MSS should report a channel state, i.e., CQI (Channel Quality Information), of a downlink to a BS. In the current IEEE 802.16 communication system, it is provided that an MSS should report the CQI of a downlink to a corresponding BS using a Report Request/Report Response (REP-REQ/REP-RSP) scheme.

That is, a BS transmits an REP-REQ message to a particular MSS, and the MSS transmits an REP-RSP message including the CQI of a downlink to the BS in response to the REP-REQ message. For example, the CQI can include an average value and a standard deviation value of a carrier-to-interference and noise ratio (CINR) or a received signal strength indicator (RSSI).

SUMMARY OF THE INVENTION

However, because the REP-REQ message does not include any information defining the uplink resource through which the MSS can transmit the REP-RSP message, the MSS attempts a random access in order to send an uplink resource allocation request to the BS. The random access may delay transmission of the REP-RSP message, preventing the application of the correct CQI in the AMC scheme. Undesirably, the transmission of the REP-RSP message functions as signaling overhead. Accordingly, there is a demand for a scheme for transmitting the correct CQI in real time with a minimized signaling overhead.

It is, therefore, an aspect of the present invention to provide an apparatus and method for transmitting/receiving CQI with a minimized signaling overhead in an OFDM/OFMDA communication system.

It is another aspect of the present invention to provide an apparatus and method for transmitting/receiving CQI in real time in an OFDM/OFDMA communication system.

It is further another aspect of the present invention to provide an apparatus and method for creating CQI appropriate for a diversity mode and a band AMC mode and transmitting/receiving the CQI in an OFDM/OFDMA communication system.

It is yet another aspect of the present invention to provide a transmission/reception apparatus and method capable of reducing CQI-related overhead for an MSS in a band AMC mode in an OFDM/OFDMA communication system.

It is still another aspect of the present invention to provide an apparatus and method for selecting a specific band having the best state from several bands and differentially transmitting/receiving CQI for the selected band in an OFDM/OFDMA communication system.

In accordance with an aspect of the present invention, a method of a terminal is provided. The method includes transmitting first information including a value related to CQI for at least one of bands; and transmitting second information including a differential CQI for the at least one of the bands, wherein each band comprises a plurality of adjacent subcarriers.

In accordance with another aspect of the present invention, a method of a base station is provided. The method includes receiving, from a terminal, first information including a value related to CQI for at least one of bands; and receiving, from the terminal, second information including a differential CQI for the at least one of the bands, wherein each band comprises a plurality of adjacent subcarriers.

In accordance with another aspect of the present invention, an apparatus of a terminal is provided. The apparatus includes a processor for acquiring channel quality information (CQI) of bands; and a transmitter for transmitting first information including a value related to CQI for at least one of the bands, and transmitting second information including a differential CQI for the at least one of the bands, wherein each band comprises a plurality of adjacent subcarriers.

In accordance with another aspect of the present invention, an apparatus of a base station is provided. The apparatus includes a receiver for receiving, from a terminal, first information including a value related to CQI for at least one of bands, and receiving, from the terminal, second information including a differential CQI for the at least one of the bands, wherein each band comprises a plurality of adjacent subcarriers.

BRIEF DESCRIPTION OF THE DRAWINGS

The above and other aspects, features, and advantages of certain embodiments of the present invention will become more apparent from the following detailed description when taken in conjunction with the accompanying drawings in which.

DETAILED DESCRIPTION OF EMBODIMENTS OF THE INVENTION

Figure 1:
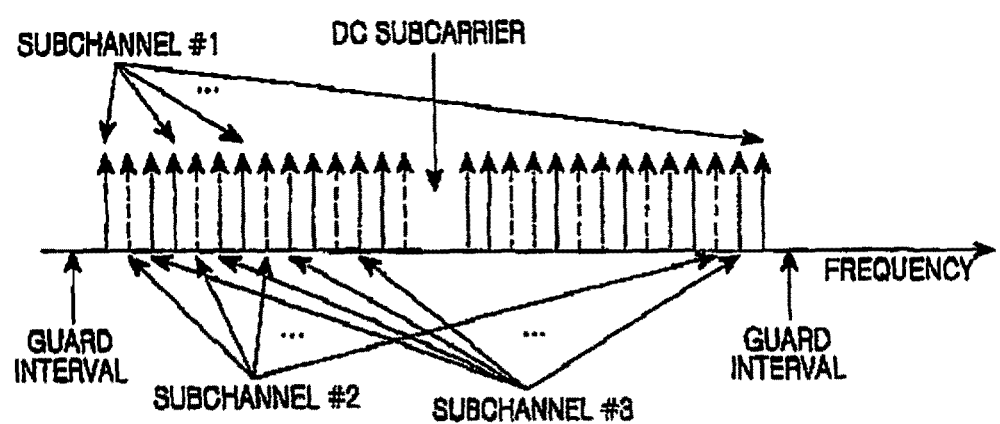
FIG. 1 is a diagram illustrating a general subchannel allocation structure in an OFDMA communication system.

Various embodiments of the present invention will now be described in detail with reference to the annexed drawings. In the drawings, the same or similar elements are denoted by the same reference numerals even though they are depicted in different drawings. In the following description, a detailed description of known functions and configurations incorporated herein has been omitted for conciseness.

The OFDMA communication system described herein proposes a scheme for transmitting correct CQI (Channel Quality Information) of a downlink in real time with minimized signaling overhead in order to support an AMC scheme. In the proposed scheme, a CQI channel (CQICH) region is allocated to a predefined interval of an uplink frame, and each MSS transmits its measured CINR information of a downlink through the allocated CQICH region. In this case, every uplink frame includes CINR information measured by each MSS, enabling a real-time AMC scheme. Allocation of the CQICH region follows a rule defined in each system. For example, channel information expressed with n bits is converted into M CQI symbols and carried by M tones allocated to a CQICH by OFDM modulation. All of the MSSs can be allocated their unique CQICH regions.

In addition, the MSSs are allocated unique frequency resources on a subchannel or a bin basis. Here, the bin is comprised of at least one OFDM symbol in at least one subcarrier. When a particular MSS is allocated a frequency resource on a per-subchannel basis, the MSS is described as being in a diversity mode, and when a particular MSS is allocated a frequency resource on a per-bin basis, the MSS is described as being in a band AMC mode.

The band is defined as a cluster of a plurality of adjacent subcarriers, unlike a subchannel defined as a cluster of a plurality of possibly nonadjacent subcarriers. That is, a difference between the diversity mode and the band AMC mode consists in whether the subcarriers allocated to one MSS are spaced apart from each other or adjacent to each other in a frequency domain. In this specification, for the sake of convenience, the subchannels are regarded as clusters of nonadjacent subcarriers, and bands are regarded as clusters of adjacent subcarriers.

Figure 2:
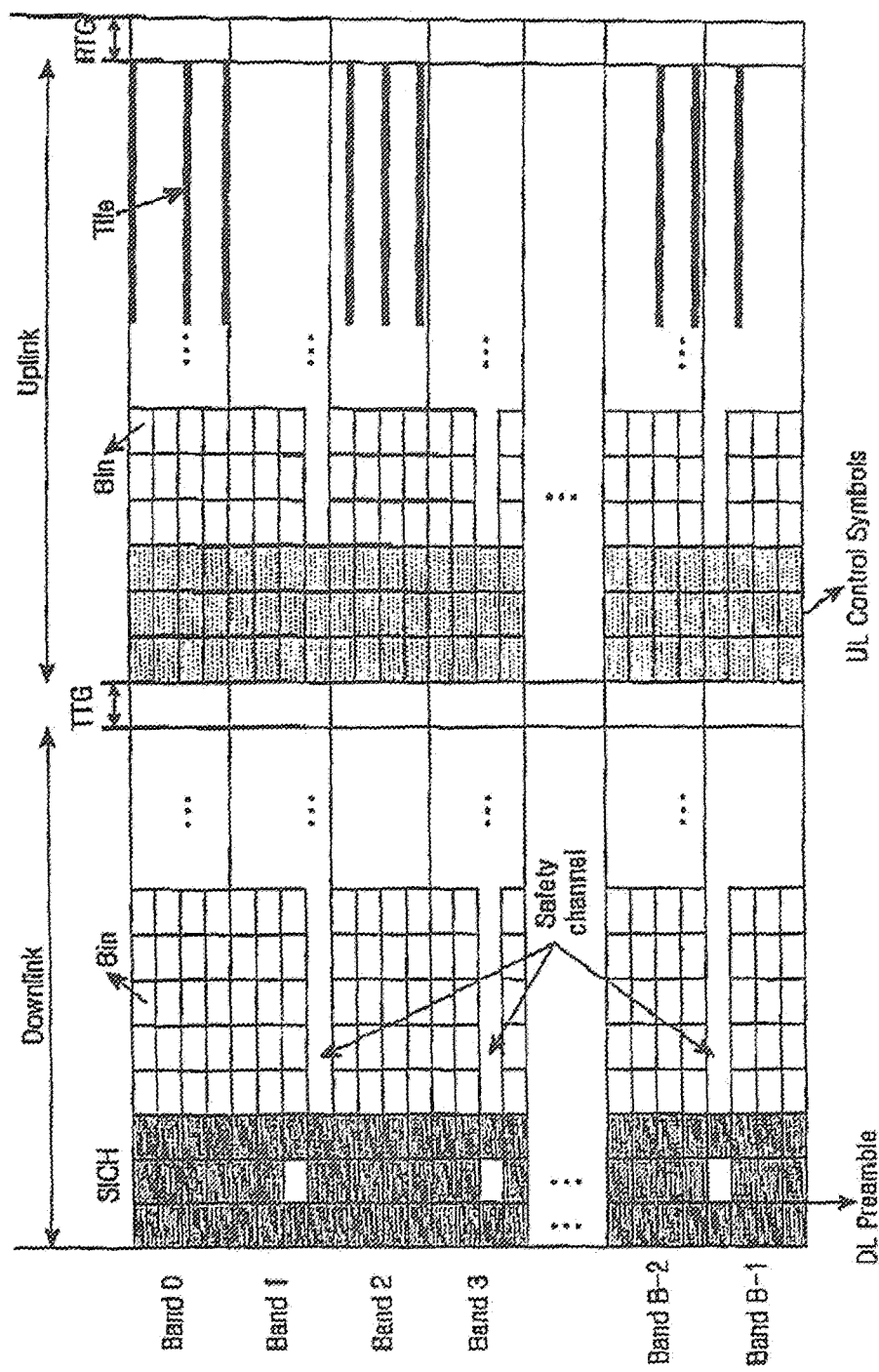
FIG. 2 is a diagram illustrating an example of an OFDM frame structure including bands and bins in an OFDMA communication system.

FIG. 2 is a diagram illustrating an example of an OFDM frame structure including bands and bins in an OFDMA communication system. Referring to FIG. 2, the OFDM frame structure includes one downlink (DL) OFDM frame and one uplink (UL) OFDM frame. The downlink frame is followed by a transmission transition gap (TTG), and the uplink frame is followed by a reception transition gap (RTG). The downlink and uplink OFDM frames are each comprised of B bands in a frequency domain, and each band includes adjacent subcarriers. Small blocks constituting each frame represent bins. The bins are comprised of 2 subcarriers and 3 OFDM symbols.

In the downlink frame, first to third time intervals are regions allocated for control. Specifically, the first and second time intervals are allocated to a downlink preamble for downlink control, and the third time interval is allocated to a system information channel (SICH). In the uplink frame, first to third time intervals are allocated to an ACK/NACK channel for Hybrid Automatic Repeat Request (HARQ) support and a CQICH.

An MSS determines if it will operate in the diversity mode or the band AMC mode, according to its channel state. Each MSS can determine the state of a downlink channel that it is receiving through the preamble of the downlink, and analyzes the CINR or the RSSI (Received Signal Strength Indicator) of the channel and the channel variation rate in terms of frequency and time based on the accumulated channel state information. As a result of the analysis, if it is determined that the channel state is stable, the MSS operates in the band AMC mode, and otherwise, the MSS operates in the diversity mode. The phrase "stable channel state" refers to a state in which the CINRs or the RSSIs of the channel are generally high and the channel does not suffer abrupt variation with the passage of time.

A criterion for the channel state analysis, based on which one of the diversity mode and the band AMC mode are selected, follows a rule defined in the system. Also, a detailed operation of selecting the operation modes can be implemented in a different way according to each system. That is, mode transition can be made at the request of an MSS monitoring a state of a received channel, or by a BS that has received a channel state report from the MSS. The important thing is the fact that when the channel state is good and its variation rate is low, the MSS operates in the band AMC mode, and otherwise, the MSS operates in the diversity mode.

In the diversity mode, because each MSS is allocated a resource on a per-subchannel basis and the subcarriers constituting a subchannel are spaced apart from each other in a frequency domain, an average value for the full frequency band is enough for the channel CINR information necessary for the AMC. A CINR measured by each MSS is converted into n-bit information and then mapped to an M-symbol CQICH. That is, if the number of MSSs is defined as $N_{MSS}$, the amount of CQI-related overhead to be allocated to an uplink is $M*N_{MSS}$.

In the band AMC mode, because each MSS is allocated a resource on a per-bin basis and the bins are adjacent to each other in a frequency domain, each MSS is allocated a partial limited interval of the full frequency band. Therefore, each MSS measures an average CINR for the limited interval (or a band to which the limited interval belongs), not for the full frequency band, and delivers the measured average CINR to a BS, thereby enabling a more elaborate AMC. In this case, in order to indicate the CINR measured by each MSS, n-bit information is needed per band and (B*n)-bit information is converted into M CQI symbols per MSS.

As a result, the CQI-related overhead to be allocated to an uplink becomes equal to $B*M*N_{MSS}$. This means that a considerable amount of the uplink resources should be spared for the CQI-related control information. Therefore, the present invention proposes a technique capable of greatly reducing the CQI-related overhead for an MSS in the band AMC mode.

Before a description of the CQICH management technique proposed by the present invention is given, a method and apparatus for transmitting/receiving CQI in an OFDMA communication system will be described in brief with reference to FIGS. 3 and 4. Herein, the description will be made with reference to a CQICH structure adopted in HPi (High-speed Portable Internet).

Figure 3:
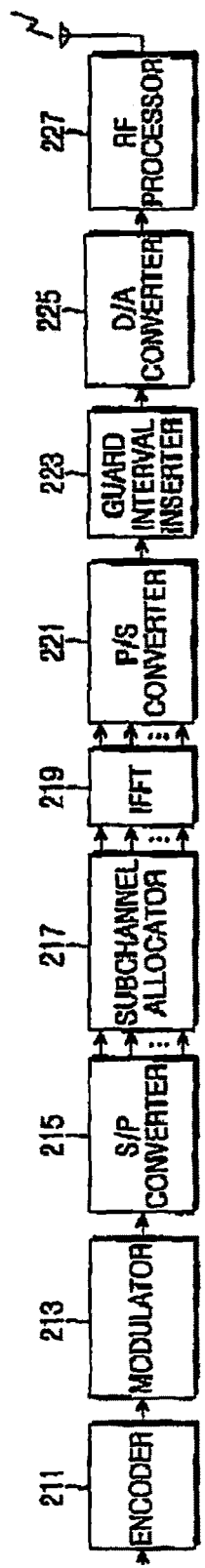
FIG. 3 is a diagram illustrating a structure of a transmitter in an OFDMA communication system according to an embodiment of the present invention.

FIG. 3 is a diagram illustrating a structure of a transmitter in an OFDMA communication system according to an embodiment of the present invention. Referring to FIG. 3, the transmitter is comprised of an encoder 211, a modulator 213, a serial-to-parallel (S/P) converter 215, a subchannel allocator 217, an Inverse Fast Fourier Transform (IFFT) unit 219, a parallel-to-serial (P/S) converter 221, a guard interval inserter 223, a digital-to-analog (D/A) converter 225, and a radio frequency (RF) processor 227.

As illustrated in FIG. 3, when the channel quality information (CQI) to be transmitted is generated, the bits indicating the CQI (hereinafter referred to as "CQI bits") are input to the encoder 211. For example, the CQI can include an average value and a standard deviation value of a carrier-to-interference and noise ratio (CINR) or a received signal strength indicator (RSSI).

The encoder 211 codes the input CQI bits with a predetermined coding scheme, and outputs the coded bits to the modulator 213. For example, a block coding scheme having a predetermined coding rate can be used as the coding scheme.

The modulator 213 modulates the coded bits output from the encoder 211 with a predetermined modulation scheme, and outputs modulation symbols to the S/P converter 215. Here, the modulation scheme can include a Differential Phase Shift Keying (DPSK) scheme, such as a Differential Binary Phase Shift Keying (DBPSK) scheme or a Differential Quadrature Phase Shift Keying (DQPSK) scheme. The S/P converter 215 parallel-converts the serial modulation symbols output from the modulator 213, and outputs the parallel modulation symbols to the subchannel allocator 217.

The subchannel allocator 217 allocates the parallel modulation symbols output from the S/P converter 215 to subcarriers of a predetermined CQICH, and outputs the allocation results to the IFFT unit 219. Here, the CQICH is comprised of at least one nonadjacent subcarrier for the diversity mode, and at least one adjacent subcarrier for the band AMC mode. The IFFT unit 219 performs N-point IFFT on the signal output from the subchannel allocator 217, and outputs the resultant signal to the P/S converter 221. The P/S converter 221 serial-converts the signal output from the IFFT unit 219, and outputs the resultant signal to the guard interval inserter 223.

The guard interval inserter 223 inserts a guard interval signal into the signal output from the P/S converter 221, and outputs the resultant signal to the D/A converter 225. Here, the guard interval is inserted to remove interference between an OFDM symbol transmitted for a previous OFDM symbol time and an OFDM symbol transmitted for a current OFDM symbol time in the OFDMA communication system.

The guard interval is inserted using one of a 'cyclic prefix' scheme in which a predetermined number of last samples of a time-domain OFDM symbol are copied and then inserted into an effective OFDM symbol, and a 'cyclic postfix' scheme in which a predetermined number of first samples of a time-domain OFDM symbol and then inserted into an effective OFDM symbol.

The D/A converter 225 analog-converts the signal output from the guard interval inserter 223, and outputs the resultant signal to the RF processor 227. Here, the RF processor 227, including a filter, a mixer and an amplifier, performs the RF processing on the signal output from the D/A converter 225 such that the signal output from the D/A converter 225 can be transmitted over the air, and transmits the RF-processed signal over the air via a transmission antenna.

Figure 4:
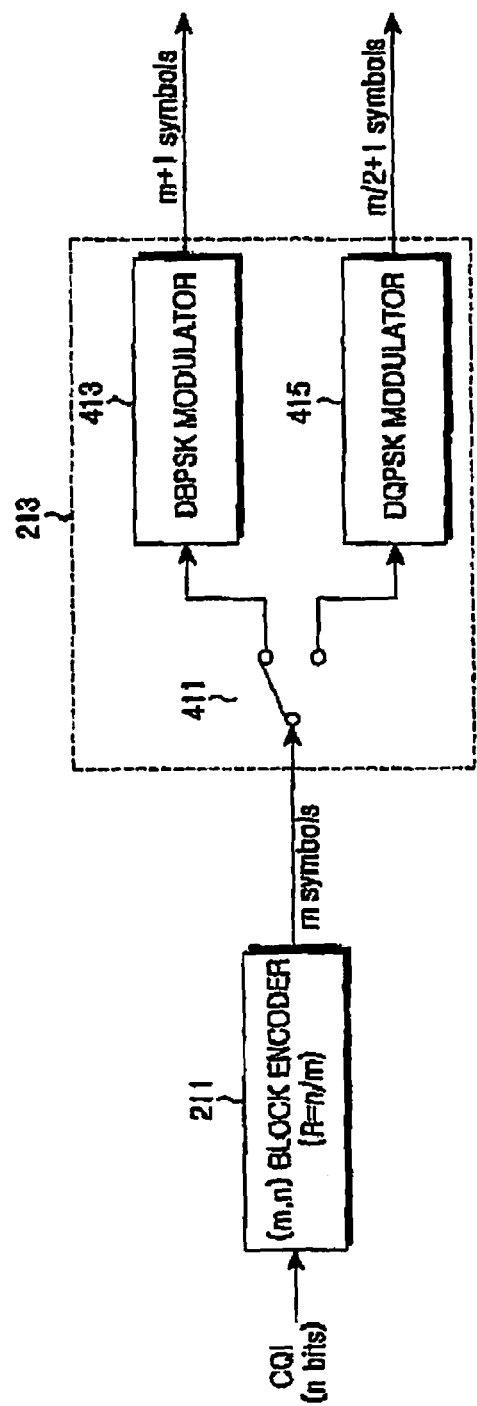
FIG. 4 is a detailed diagram illustrating structures of the encoder and the modulator illustrated in FIG. 3.

FIG. 4 is a detailed diagram illustrating structures of the encoder 211 and the modulator 213 illustrated in FIG. 3. As illustrated in FIG. 4, the encoder 211 is comprised of an (m,n) block encoder, and the modulator 213 is comprised of a switch 411, a DBPSK modulator 413, and a DQPSK modulator 415.

Referring to FIG. 4, n CQI bits are input to the (m,n) block encoder 211. The (m,n) block encoder 211 block-codes the n CQI bits into m symbols, and outputs the m symbols to the switch 411. The switch 411 outputs the signal output from the (m,n) block encoder 211 to the DBPSK modulator 413 or the DQPSK modulator 415 according to the modulation scheme used in the transmitter. For example, when the transmitter uses the DBPSK scheme, the switch 411 outputs its input signal to the DBPSK modulator 413, and when the transmitter uses the DQPSK scheme, the switch 411 outputs its input signal to the DQPSK modulator 415.

The DBPSK modulator 413 modulates the signal output from the (m,n) block encoder 211 with the DBPSK scheme, and outputs (m+1) modulation symbols. The DQPSK modulator 415 modulates the signal output from the (m,n) block encoder 211 with the DQPSK scheme, and outputs $$\left(\frac{m}{2}+1\right)$$

modulation symbols.

A description will now be made of a CQI structure and a CQICH management scheme according to an operation mode of an MSS.

First, the diversity mode will be described. As described above, the diversity mode refers to an operation mode in which a frequency band is divided into subchannels, each of which is a set of nonadjacent subcarriers, and in this mode, each MSS is allocated a predetermined number of the subchannels, determined according to the amount of transmission information. In this case, because each MSS receives information allocated to subcarriers uniformly distributed over the full system frequency band, the MSS measures an average CINR value for the full frequency band of a downlink frame and generates the measured average CINR as CQI.

If a CQICH allocated to each MSS can accept n-bit CQI information, the MSS can express one of the $2^n$ predetermined CINR intervals. As a result, each MSS transmits an interval including an average CINR value for the full frequency band to a BS through a CQICH. In the diversity mode, because the average CINR value for the full frequency band becomes CQI, this is referred to as "full CQI." If the number of MSSs is defined as $N_{MSS}$, the number of tones allocated to a CQICH in an uplink becomes equal to $M*N_{MSS}$. Because an allocation region for the CQICH is located in a predetermined position in a control signal interval of an uplink, a separate control signal for the designation of a CQICH position is not required. A CQICH is allocated every uplink frame.

Figure 5:
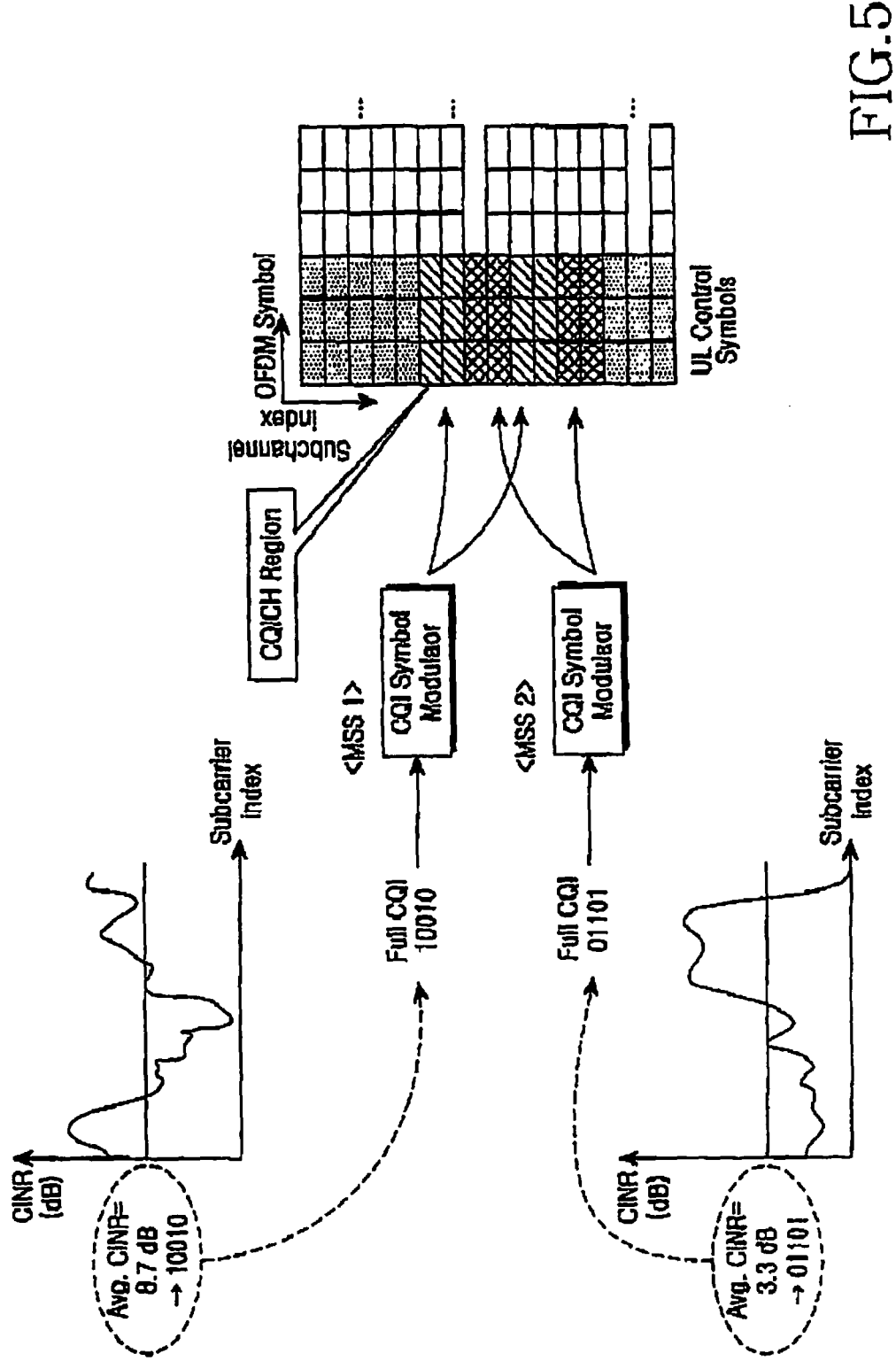
FIG. 5 is a diagram illustrating an example of a structure of full CQI.

FIG. 5 is a diagram illustrating an example of a structure of full CQI. Referring to FIG. 5, when two MSSs are located in a cell, the MSSs receive downlink signals through different subcarriers. It will be assumed herein that the MSSs each have a CQICH transmitter for converting 5-bit input information into 12 CQI symbols.

Each MSS calculates an average CINR for the full frequency band through a preamble of a downlink frame. For example, it is assumed that an MSS#1 has acquired 8.7 dB and an MSS#2 has acquired 3.3 dB. Because the acquired values are average values for the full frequency band, they can be different from the actual values of the respective subcarriers. Because the measured value, 8.7 dB, of the MSS#1 falls within a range of between 8 and 9 dB, it is converted into 5-bit CQI information '10010' indicating the corresponding range. Likewise, a measured value, 3.3 dB, of the MSS#2 is converted into CQI '01101'. Subsequently, the respective CQI is coded and then modulated into 12-tone CQI symbols by the CQICH transmitters of the respective MSSs. In each MSS, the CQI symbols are mapped to a CQICH region allocated to the corresponding MSS, in a UL control symbol region.

Next, the band AMC mode will be described. In the band AMC mode, a full frequency band is divided into bands which are sets of adjacent subcarriers, and in this mode, each MSS is allocated a set of bins which are unit elements forming the band. A bin is a cluster of adjacent tones in the frequency and the time domains. Because adjacent bins in the frequency and time domains are allocated to each MSS, the MSS is allocated adjacent resources in the frequency and time domains.

An MSS in the band AMC mode should convert an average CINR value for respective frequency bands of B bands constituting the full system frequency band, not the average CINR for the full frequency band, into the CQI. Assuming that the average CINR value for the respective frequency bands of the B bands is expressed with n-bit information, if the CINR values for all of the B bands are reported, the number of uplink tones required for a CQICH becomes equal to $B*M*N_{MSS}$. Because this value corresponds to an amount that could possibly be occupying most of the uplink resources, there is a demand for a special CQI generation method and CQICH management method for the band AMC mode.

An MSS in the band AMC mode transmits the CQI indicating if an average CINR value for n bands selected from B bands constituting the full frequency band has increased or decreased from the previous value, to a BS using a CQICH. Because a difference between the current average CINR value for the bands and the previous average CINR value becomes the CQI, this is referred to as the "differential CQI."

If the number of MSSs located in a cell is defined as $N_{MSS}$, the number of CQICH tones allocated to an uplink becomes equal to $M*N_{MSS}$. Because an allocation region for the CQICH is located in a predetermined position in a control signal interval of an uplink, a separate control signal for designating a position in the CQICH allocation region is not required. The differential CQI is allocated and transmitted every frame after an absolute CINR value in a message form is delivered. The absolute CINR value is periodically transmitted at intervals of several or tens of frames in order to update the CINR values for respective bands, stored in a BS.

A scheme using the differential CQI delivers a channel condition of each band using relatively lower overhead. Because the BS can monitor a CINR of each band through the differential CQI, it can perform optimized AMC for each band, contributing to an increase in the entire throughput of the system.

Figure 6:
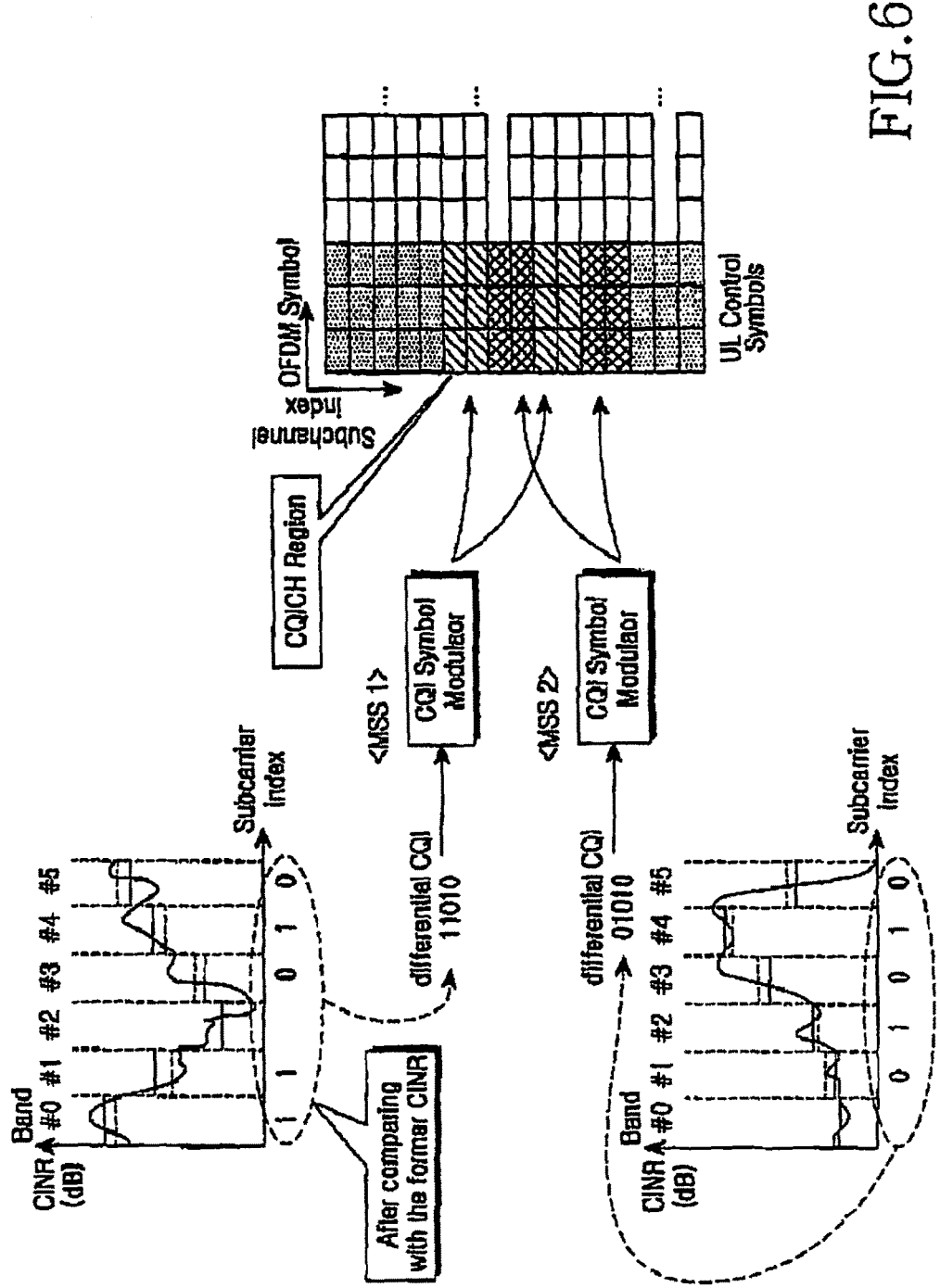
FIG. 6 is a diagram illustrating an example of a structure of differential CQI according to an embodiment of the present invention.

FIG. 6 is a diagram illustrating an example of a structure of differential CQI according to an embodiment of the present invention. Referring to FIG. 6, when two MSSs are located in a cell, the MSSs receive downlink signals through different subcarriers. The MSSs each calculate an average CINR for their corresponding frequency bands of the downlink preambles, for each of their allocated bands in the full frequency band of an uplink.

For example, it will be assumed that the full frequency band is divided into a total of 6 bands, and an absolute average CINR value for each band has been transmitted to a BS in a message form through a previous uplink frame.

As illustrated in FIG. 6, an MSS#1 selects 5 bands #0, #1, #3, #4 and #5 having higher average CINR values in a previous frame. The MSS#1 determines the differential CQI for the respective bands by comparing the average CINR values (represented by dotted lines in FIG. 6) measured in the previous frame with the currently measured CINR values (represented by solid lines in FIG. 6), for the selected 5 bands. If a current value is greater than its previous value, a bit for the corresponding band is set to '1', and if a current value is less than its previous value, a bit for the corresponding band is set to '0'.

In case of FIG. 6, a differential CQI value for the selected 5 bands becomes '11010', and the differential CQI value becomes an input to a CQI symbol modulator. In the same manner, an MSS#2 generates a differential CQI value '01010' for 5 bands #1, #2, #3, #4 and #5, for the CQI symbolization.

The two differential CQI values are mapped to CQICH regions allocated individually to the MSSs in the UL control symbol region. Then a BS updates a previously stored absolute average CINR value for each band based on the received differential CQI information for each band, thereby acquiring a current average CINR value for each band. In this manner, the BS can perform more elaborate AMC based on the channel information for each band.

In this case, a band #0 is selected for the MSS#1 and a band #4 is selected for the MSS#2. Because the selected bands have higher CINRs, the BS selects an AMC level available for the high-speed transmission, and transmits the downlink data for the MSS#1 and the downlink data for the MSS#2 through the band #0 and the band #4, respectively.

In a process of transmitting the differential CQI, the MSSs are not required to separately inform as to which bands the respective bits of the differential CQI are mapped, for the following reason. That is, because the MSSs are operating in the band AMC mode, there is a very low probability that the order of bands measured at the time when an absolute CINR value for each band is transmitted will change before the next absolute CINR is transmitted. If the channel state suffers a considerable change, the MSSs transition to the diversity mode, in which only the full CQI is used instead of the differential CQI.

That is, in the band AMC mode, a probability is low at which a channel varies with the passage of time, and this means that a channel state of each band does not suffer a considerable change for a predetermined amount of time. In the case of the band AMC mode, there is a high probability that a band having a high average CINR record will continuously show a high CINR and a band having a low average CINR record will continuously show a low CINR, within the predetermined time. However, there is a low probability that a channel state of a band exhibiting a high average CINR will abruptly change exhibiting a low CINR within a predetermined time.

The "predetermined time" defined to guarantee the stability of the channel is a system parameter determined through computer simulation and actual measurement. Also, the "predetermined time" is used as a CQICH report cycle in the band AMC mode. The "CQICH report cycle" refers to a time interval between a frame where an MSS reports an absolute value of an average CINR value for each band in a message form, and the next absolute value report frame. In an interval between the consecutive absolute value report frames, the differential CQI values rather than the absolute CINR values are repeatedly transmitted at shorter time intervals.

Figure 7:
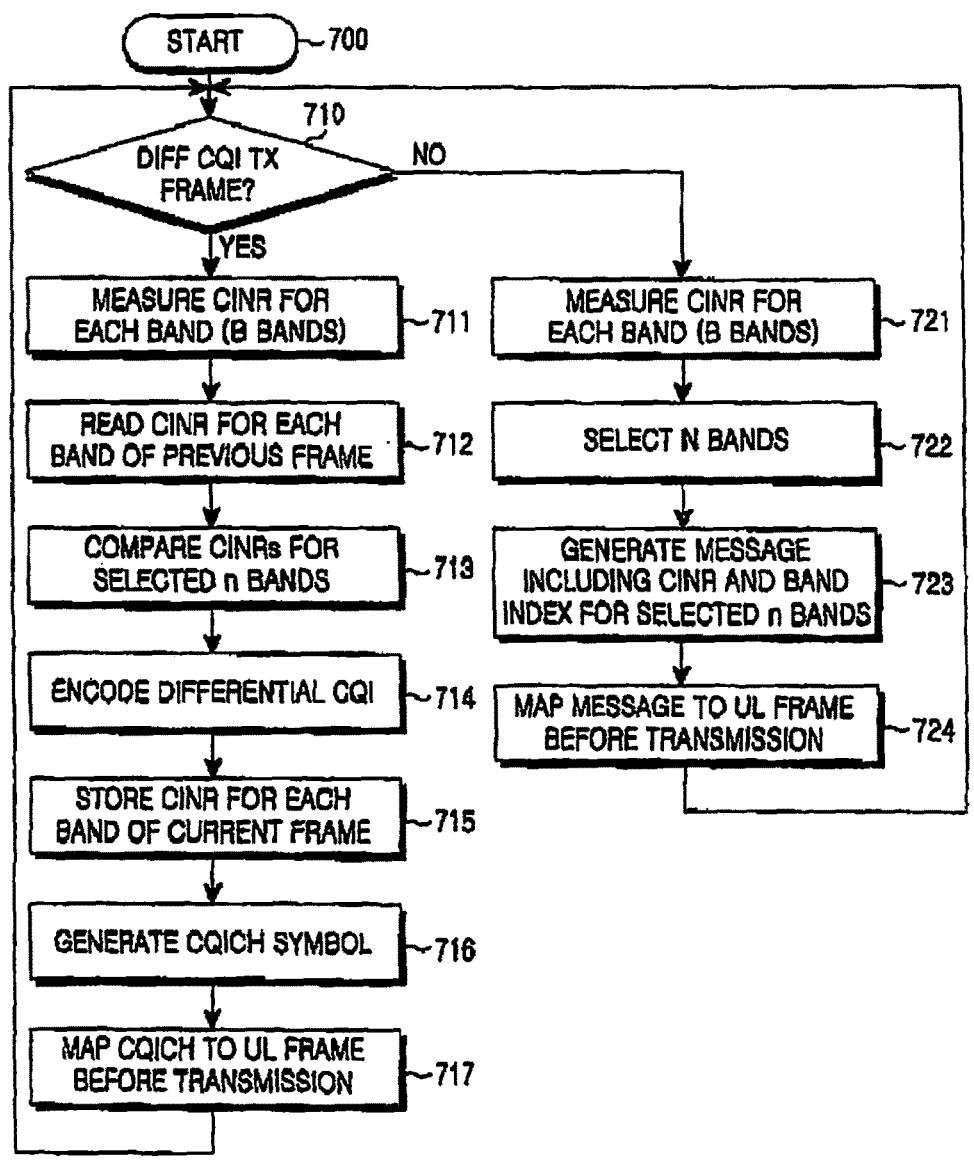
FIG. 7 is a flowchart illustrating an operation of an MSS according to an embodiment of the present invention.

FIG. 7 is a flowchart illustrating an operation of an MSS according to an embodiment of the present invention. Referring to FIG. 7, an MSS starts a CQI report operation in step 700, and determines in step 710 whether the current frame is a frame where it should deliver an absolute average CINR value for each band or a frame where it should transmit the differential CQI. The delivering of the absolute CINR value should be achieved in a cycle, and the cycle, as described above, is determined as a system parameter. For the efficiency of the uplink resources, the absolute CINR value is transmitted less frequently, compared with the differential CQI.

If it is determined that the current frame is a frame where it should deliver the absolute CINR value, that is not the differential CQI, the MSS proceeds to step 721. In step 721, the MSS measures the average CINR values for all of the B bands constituting the full frequency band. In step 722, the MSS selects N bands according to the measured CINR values. N is greater than or equal to the number 'n' of bits allocated to a CQICH, and is less than or equal to the total number 'B' of bands. The reason for selecting the N bands is to prepare for a case where it is not possible to measure the CINR values for all of the B bands due to the limitation of uplink resources. The selected N bands may be the bands having the highest CINR values. In an alternative embodiment, however, they can be selected according to a rule defined in the system.

The MSS re-selects the n bands where it will report an increment/decrement of a CINR using differential CQI, among the N bands. A selection algorithm for the n bands is an algorithm using only the CINR information for the N bands as an input parameter, and is shared by the MSS and a BS. That is, the BS can recognize the n bands selected by the MSS based on the CINR information for the N bands. Likewise, the n bands can be the bands having the highest CINR values among the N bands.

Next, in step 723, the MSS generates a message including the CINR values for the selected n bands and indexes of the selected n bands. Thereafter, in step 724, the generated message is mapped to an uplink frame and then transmitted to a BS. Then the BS determines a modulation scheme and a coding rate for each band of the MSSs according to the CINR values for the n bands and the CINR values for each band of other MSSs.

However, if it is determined in step 710 that the current frame is a frame for transmission of a differential CQI, the MSS proceeds to step 711. In step 711, the MSS measures the average CINR values for the respective bands. The reason for measuring the CINR values for all of the B bands is to monitor a channel variation situation for each band. The reason is because when the channel state suffers an abrupt change, it is necessary to transition from the band AMC mode to the diversity mode.

Next, in step 712, the MSS reads the previously stored CINR values for the respective bands in a previous frame, for the n bands selected during the transmission of the previous absolute CINR values from among all of the B bands. In step 713, the MSS compares the measured values with the read CINR values for the corresponding bands in the previous frame. In step 714, if the measured CINR values are greater than or equal to the read CINR values as a result of the comparison, the MSS codes bits for corresponding bands in the differential CQI value into '1', and if the measured CINR values are less than the read CINR values, the MSS codes the bits into '0', thereby generating n-bit differential CQI.

In step 715, the measured CINR values for the respective bands are stored to be used as reference values in the next frame. In step 716, the n-bit differential CQI is modulated into CQICH symbols. In step 717, the CQICH symbols are mapped to an uplink frame and then transmitted to the BS.

Then the BS estimates a change of the n bands based on the differential CQI. That is, the BS increases or decreases, by a predetermined value, the absolute CINR values for the n bands among the stored absolute CINR values for the respective bands according to the respective bits of the differential CQI information. Because the differential CQI indicates only an increment/decrement of a CINR value for a corresponding band, the BS cannot determine a difference between the CINR value and a previous CINR value. However, given that the band AMC mode is provided for an environment where channel variation of each band is stable, the performance deterioration caused by the defect is negligible as compared with an increase in efficiency of uplink resources due to the use of the differential CQI.

Advantageously, the present invention transmits the CQI during every frame with minimized signaling overhead in an OFDMA communication system, thereby applying the CQI in real time. In addition, the present invention proposes a method for generating the CQI suitable for characteristics of the diversity mode and the band AMC mode, and a scheme for managing the CQI.

While the present invention has been shown and described with reference to certain embodiments thereof, it will be understood by those skilled in the art that various changes in form and details may be made therein without departing from the spirit and scope of the invention as defined by the appended claims.

What is claimed is:

1. A method of a terminal, the method comprising:
    determining channel quality information (CQI) for a plurality of bands;
    identifying a predetermined number of bands for transmission of differential CQI, the predetermined number of bands having highest CQIs among the plurality of bands;
    transmitting first information including a predetermined number of values respectively related to CQI for the predetermined number of bands among the plurality of bands; and
    transmitting second information including the differential CQI for the predetermined number of bands,
    wherein each of the predetermined number of bands comprises a plurality of adjacent subcarriers.

2. The method of claim 1, wherein each of the predetermined number of bands further comprises a plurality of orthogonal frequency division multiple access (OFDMA) symbols.

3. The method of claim 1, wherein the first information is transmitted by using an uplink message and the second information is transmitted via a feedback channel for reporting channel quality information.

4. The method of claim 1, wherein the second information indicates an increment or a decrement of the CQI for the predetermined number of bands.

5. The method of claim 1, wherein the predetermined number of bands is equal to a number of bits of the second information.

6. The method of claim 1, wherein the second information comprises a plurality of bits mapped to the predetermined number of bands respectively, and one of the bits is set to '1' if a CQI measurement for a corresponding band is greater than a previous CQI measurement for the corresponding band, and set to '0' if the CQI measurement is less than the previous CQI measurement.

7. The method of claim 1, wherein the second information is transmitted via a control channel of an uplink.

8. A method of a base station, the method comprising:
    receiving, from a terminal, first information including a predetermined number of values respectively related to channel quality information (CQI) for a predetermined number of bands, the predetermined number of bands being identified by the terminal for transmission of differential CQI as having highest CQIs among a plurality of bands; and
    receiving, from the terminal, second information including the differential CQI for the predetermined number of bands,
    wherein each of the predetermined number of bands comprises a plurality of adjacent subcarriers.

9. The method of claim 8, wherein each of the predetermined number of bands further comprises a plurality of orthogonal frequency division multiple access (OFDMA) symbols.

10. The method of claim 8, wherein the first information is received by using an uplink message and the second information is received via a feedback channel for reporting channel quality information.

11. The method of claim 8, wherein the second information indicates an increment or a decrement of the CQI for the predetermined number of bands.

12. The method of claim 8, wherein the predetermined number of bands is equal to a number of bits of the second information.

13. The method of claim 8, wherein the second information comprises a plurality of bits mapped to the predetermined number of bands respectively, and one of the bits is set to '1' if a CQI measurement for a corresponding band is greater than a previous CQI measurement for the corresponding band, and set to '0' if the CQI measurement is less than the previous CQI measurement.

14. The method of claim 8, wherein the second information is received via a control channel of an uplink.

15. An apparatus of a terminal, the apparatus comprising:
a processor configured to
determine channel quality information (CQI) for a plurality of bands, and
identify a predetermined number of bands for transmission of differential CQI, the predetermined number of bands having highest CQIs among the plurality of bands; and
a transmitter configured to
transmit first information including a predetermined number of values respectively related to the CQIs for the predetermined number of bands, and
transmit second information including the differential CQI for the predetermined number of bands,
wherein each of the predetermined number of bands comprises a plurality of adjacent subcarriers.

16. The apparatus of claim 15, wherein each of the predetermined number of bands further comprises a plurality of orthogonal frequency division multiple access (OFDMA) symbols.

17. The apparatus of claim 15, wherein the first information is transmitted by using an uplink message and the second information is transmitted via a feedback channel for reporting channel quality information.

18. The apparatus of claim 15, wherein the second information indicates an increment or a decrement of the CQI for the predetermined number of bands.

19. The apparatus of claim 15, wherein the predetermined number of bands is equal to a number of bits of the second information.

20. The apparatus of claim 15, wherein the second information comprises a plurality of bits mapped to the predetermined number of bands respectively, and one of the bits is set to '1' if a CQI measurement for a corresponding band is greater than a previous CQI measurement for the corresponding band, and set to '0' if the CQI measurement is less than the previous CQI measurement.

21. The apparatus of claim 15, wherein the second information is transmitted via a control channel of an uplink.

22. An apparatus of a base station, the apparatus comprising:
a receiver configured to
receive, from a terminal, first information including a predetermined number of values respectively related to channel quality information (CQI) for a predetermined number of bands, the predetermined number of bands being identified by the terminal for transmission of differential CQI as having highest CQIs among a plurality of bands, and
receive, from the terminal, second information including the differential CQI for the predetermined number of bands,
wherein each of the predetermined number of bands comprises a plurality of adjacent subcarriers.

23. The apparatus of claim 22, wherein each of the predetermined number of bands further comprises a plurality of orthogonal frequency division multiple access (OFDMA) symbols.

24. The apparatus of claim 22, wherein the first information is received by using an uplink message and the second information is received via a feedback channel for reporting channel quality information.

25. The apparatus of claim 22, wherein the second information indicates an increment or a decrement of the CQI for the predetermined number of bands.

26. The apparatus of claim 22, wherein the predetermined number of bands is equal to a number of bits of the second information.

27. The apparatus of claim 22, wherein the second information comprises a plurality of bits mapped to the predetermined number of bands respectively, and one of the bits is set to '1' if a CQI measurement for a corresponding band is greater than a previous CQI measurement for the corresponding band, and set to '0' if the CQI measurement is less than the previous CQI measurement.

28. The apparatus of claim 22, wherein the second information is received via a control channel of an uplink.

\* \* \* \* \*